United States Patent [19]

Wang

[11] 4,189,120
[45] Feb. 19, 1980

[54] VARIABLE CAMBER LEADING EDGE FLAP
[75] Inventor: Timothy Wang, Bellevue, Wash.
[73] Assignee: Boeing Commercial Airplane Company, Seattle, Wash.
[21] Appl. No.: 860,645
[22] Filed: Dec. 14, 1977
[51] Int. Cl.² .......................... B64C 3/50; B64C 9/24
[52] U.S. Cl. .................................... 244/214; 244/219
[58] Field of Search ................. 244/214, 219, 213, 48, 244/210

[56] References Cited
U.S. PATENT DOCUMENTS
3,504,870  4/1970  Cole et al. ...................... 244/214 X

FOREIGN PATENT DOCUMENTS
1917532  10/1970  Fed. Rep. of Germany ........... 244/214

Primary Examiner—Barry L. Kelmachter
Attorney, Agent, or Firm—H. Gus Hartmann; Bernard A. Donahue

[57] ABSTRACT

Tailoring the contour and chord length of a variable camber leading edge flap for the tapered wing of an aircraft is aimed at improving the aircraft's low speed performance particularly for takeoff and landing. Each segment of a spanwise series of leading edge flap segments has a constant chord flexible panel and a spanwise tapered leading edge or bullnose member. By using different chord flexible panels in adjacent flap segments, together with a tapered bullnose, the effective chord length and contour of the variable camber leading edge flap can be varied smoothly in the spanwise direction without resorting to different flap linkage mechanisms at each spanwise station. Further, through the change in cross-sectional shape of the bullnose member along the semi-span of the wing, a change in the effective flap angle (angle-of-incidence of the flap-chord relative to the wing-chord plane) is also produced. For additional variation in the flap angle in a spanwise direction along the leading edge of the fixed wing section, a twist can be imparted to the constant chord flexible panel through a slight variation in the degree of angular rotation of common flap linkage mechanisms attached to each end of the flap segment; however, the greatest amount of change in flap angle is accomplished through the change in cross-sectional shape of the bullnose member and only a slight amount is due to the variation in the degrees of angular rotation of the linkage mechanism.

19 Claims, 14 Drawing Figures

VARIABLE CAMBER LEADING EDGE FLAP

SUMMARY OF THE INVENTION

In general the purpose of a leading edge flap system is to delay stall inception or airflow separation over the upper surface of an airfoil by providing an increase in camber in the nose area of the airfoil, i.e., to smooth out the airflow at high angles-of-attack. However, at low angles-of-attack the leading edge flap tends to introduce an unfavorable disturbance to the airflow which manifests itself into a reduction of the Lift/Drag ratio or aerodynamic efficiency.

Within limits, the larger the leading edge flap, the greater the stall protection for operation of an airplane during landing approach and takeoff. However, a wing leading edge flap geometry that is optimized for the approach $C_{Lmax}$ invariably compromises the Lift/Drag ratio for the takeoff and climb out operations. This is because the amount of wing leading edge camber that is required for lowering the airfoil upper surface suction peak at a high-lift and high angle-of-attack condition, tends to raise the suction peak along the undersurface of the wing airfoil at a low lift and low angle-of-attack condition. Therefore, cambering the wing leading edge to delay upper surface stall for the approach $C_{Lmax}$ condition, promotes lower surface stall and decreases the Lift/Drag ratio for the takeoff condition.

One solution to this problem would be to have a different wing leading edge flap geometry for each of the conditions of takeoff and landing; however, in most cases the increased complexity of the flap actuating linkage mechanism makes such a flap system unacceptable.

The wing leading edge, tapered and twisted flap system of the present invention, is preferably divided into equal length spanwise segments; with each flap segment consisting of a rectangular, constant chord, flexible panel, and a spanwise tapered bullnose member foldably attached to the leading edge of the flexible panel. The rectangular constant chord, flexible panel permits the use of identically sized linkage mechanisms at different stations for chordwise extension and retraction of each of the spanwise flap segments. By using different chord panels for adjacent segments and blending the resulting step with spanwise tapered bullnose members a smoothly tapered leading edge flap is produced.

For another embodiment, the spanwise segmented flap system could be divided into a series of spanwise groups of flap segments, with each group being characterized by two or more identically sized linkage mechanisms, or common linkage members, in combination with flexible panels of the same chord width.

In a further embodiment, it may be desirable to retain a number of constant chord type of flap segments in the wing leading edge flap system; because, the tapered flap or tapered bullnose member is more costly both from the manufacturing standpoint and in the number of parts that would have to be retained in the spares inventory; since, the components of a tapered flap are generally not interchangeable between the right and left wing of an aircraft, as a constant chord type of flap would be.

In the present invention, the spanwise tapering of the leading edge flap system for the wing of an aircraft, is produced by a cross-sectional change of the bullnose member in a spanwise direction, in combination with a constant chord flexible panel. The bullnose member is tapered spanwise in order to provide a smooth transition in leading edge contour between constant chord flexible panels or groups thereof.

Another manner for producing a spanwise tapered leading edge flap, would be to taper the flexible panel spanwise; however, with a spanwise tapered panel, the linkage mechanism between the shorter chordwise end of the panel and the longer chordwise end, would have to be sized differently. Furthermore, the ends of the flap segment with foldable bullnose cannot remain in a plane for both extended and retracted positions. With the non-planar ends, interference between adjacent segments will be a problem.

One of the objects of this invention, is to produce a variable camber, tapered, leading edge flap that is low in cost, has a minimum number of parts, and accomplishes this by maintaining the shape of spanwise segmented flexible flap panel members as rectangular, and changing the spanwise taper of the flap segments to produce a change in flap camber through a change in the cross-sectional size and shape of the bullnose member.

One of the advantages of the tapered leading edge flap system of this invention is that in maintaining the flexible panels rectangular in shape when proceeding spanwise outboard from a greater chord dimensioned flap panel member to one of a lessor chord dimension and making up for the discontinuity between the adjacent flap panel members through the use of tapered bullnose members, is that this permits the utilization of flap actuating linkage mechanisms which are sized the same or identically sized for each panel or groups of panels in order to provide for the commonality of the parts. This feature of commonality in the linkage mechanisms is desirable from a cost savings standpoint and also from the standpoint of reducing the number of parts that have to be retained in inventory.

Another advantage of the tapered leading edge flap system is that it makes optimum use of the stowage space forward of the front wing spar for a tapered in planform wing.

Another object of this invention is to provide a wing leading edge flap system that has a good lift-to-drag ratio for improving the flight operation of an aircraft during maximum gross weight takeoff operation. Also, the short field operational capability of an aircraft could be enhanced if the approach and landing mode $C_{Lmax}$ were increased, so as to permit a reduction in the landing approach speed without a penalty in system weight or performance of the aircraft when operating in the cruise mode. A major source of the lower lift-to-drag ratios has been identified as undersurface airflow separation and the profile drag of the generally known simple hinged leading edge type of flap. The airflow separation which initiates stall on the wing, is usually localized so that the requirement for stall protection varies along the span. The spanwise segmented leading edge flap system of this invention provides a practical leading edge geometry which reasonably meets the aerodynamics requirements by optimizing the spanwise tapered planform shape and sizing the flap segments according to the amount of spanwise stall protection required; and also, minimizing the separation of the airflow at the conditions corresponding to maximum gross weight takeoff.

DESCRIPTION OF THE PREFERRED EMBODIMENTS

Figure 1:
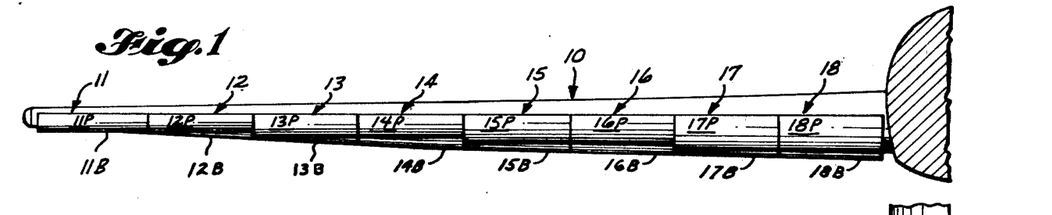
FIG. 1 is a front view of an extended leading edge flap system for the wing of an aircraft, showing a segmented flap span wherein each spanwise segment consists of a rectangular or constant-chord flexible panel with a preformed leading edge member or bullnose that transforms the discontinuity between the rectangular panels of different chords into a smooth leading edge contour.
Figures 2, 3:
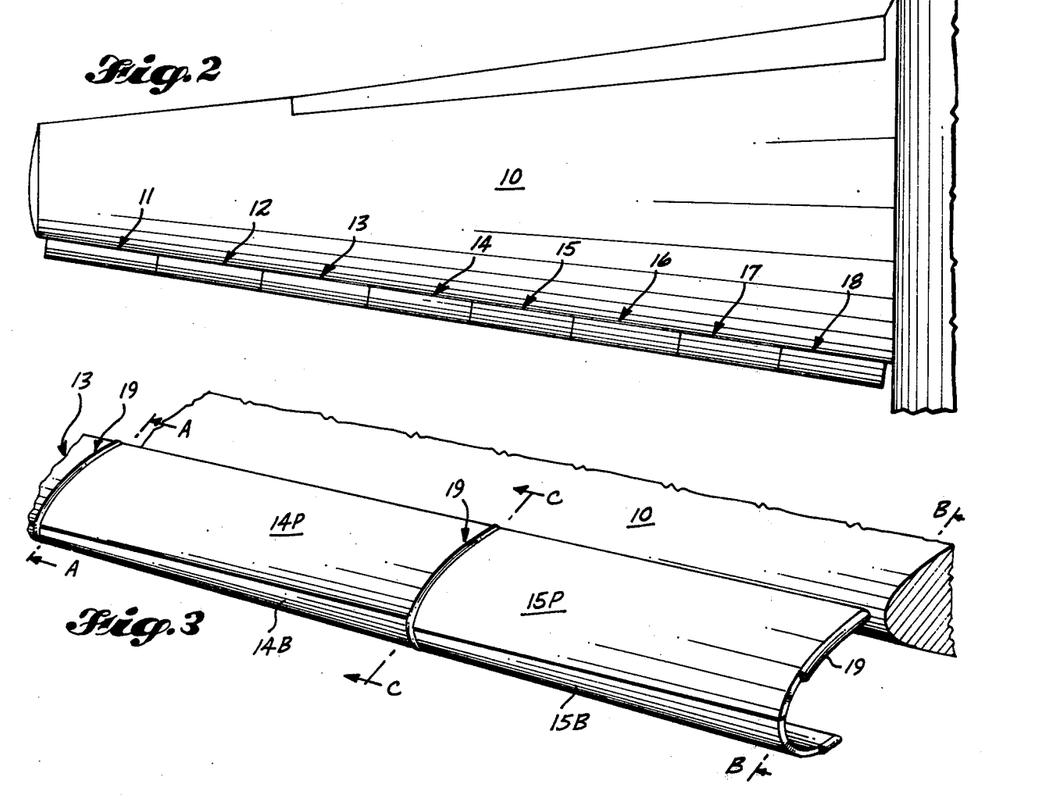
FIG. 2 is a top plan view of FIG. 1.
FIG. 3 is an enlarged perspective view of two spanwise flap segments in the extended position.

FIGS. 1 and 2 are front and plan views respectively, of an aircraft wing 10 having a spanwise segmented leading edge flap system shown divided into eight, approximately equal length flap segments 11 through 18. The two spanwise inboard flap segments 17, 18 and the one spanwise outboard flap segment 11, are depicted as being of the constant-chord type; and each of the remaining inbetween segments 12-16 consists of a constant-chord flexible panel and a tapered leading edge structure or bullnose member. Each of the spanwise flap segments 11 through 18 has a flexible panel designated by the suffix "P" and a foldable bullnose member designated by the suffix "B".

The tapered bullnose members 12B-16B provide for a smooth leading edge contour transition between the constant-chord flap segments 11 and 17; and also produce a continuously varying flap airfoil cross-section, spanwise or a planform tapered flap group, with a minimum number of different linkages and parts.

Further, as shown, the eight segment flap system is sectioned into four pairs or groups; with each group being characterized by common sized linkages and flexible panels of the same chordwise dimension, and generally with two spanwise spaced apart linkage mechanisms for the chordwise actuation of each of the flap segments.

FIG. 3 is an enlarged perspective view of two leading edge flap segments 14, 15, in the extended position and shows more clearly the tapered bullnose members 14B, 15B and the resilient sealing means 19, such as a bulb seal, positioned between the adjacent spanwise edges of the flap segments 14 and 15. In general, it is necessary to have a gap between the flap segments for clearance purposes to prevent a binding action due to wing flexure; but, it is also important from an aerodynamic standpoint to eliminate as much as possible the through-flow of air between the extended flap segments. Since the highest air velocities are in the region of greatest curvature of the variable camber flap segment, i.e., the local velocity is greatest at the leading edge of the flap and the velocity of the airflow decreases towards the trailing edge of the flap, it may be desirable to slightly displace or shift the adjacent spanwise-ends of the flap segments so that their relatively thin edge is in approximate alignment spanwise. Further, it is necessary that the adjacent flap panels be sealed in order that the air leakage is acceptable.

Figure 3A:
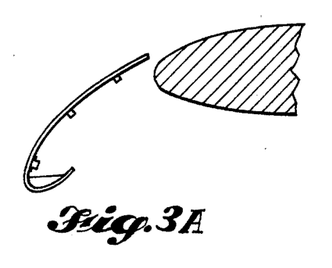
FIG. 3A is a cross-sectional view of the spanwise flap segments taken at A—A of FIG. 3.
Figure 3B:
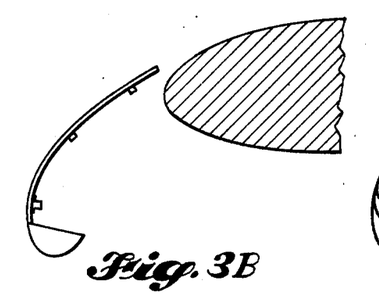
FIG. 3B is a cross-sectional view of the spanwise flap segments taken at B—B of FIG. 3.

FIGS. 3A and 3B are cross-sectional views of the flap segments shown in FIG. 3 taken as indicated at the stations A—A and B—B respectively.

Figure 3C:
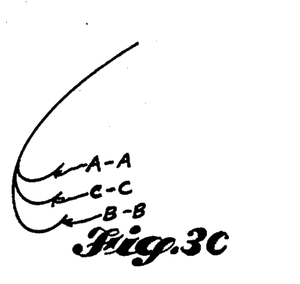
FIG. 3C is an overlay composite of cross-sections of the flap segments taken at A—A, B—B and C—C of FIG. 3.

FIG. 3C is an overlay composite of the flap cross-sections at stations A—A, B—B, and C—C respectively shown in FIG. 3.

FIGS. 4A to 4D are graphs depicting a comparison between the leading edge flap geometry of the present invention shown in solid lines with that of a most recently known high-lift leading edge flap system, shown in dashed lines, for a STOL (short takeoff and landing) airplane such as the Boeing YC-14. For purposes of comparison, the leading edge flap system for both are divided into eight, approximately equal length segments.

Figure 4A:
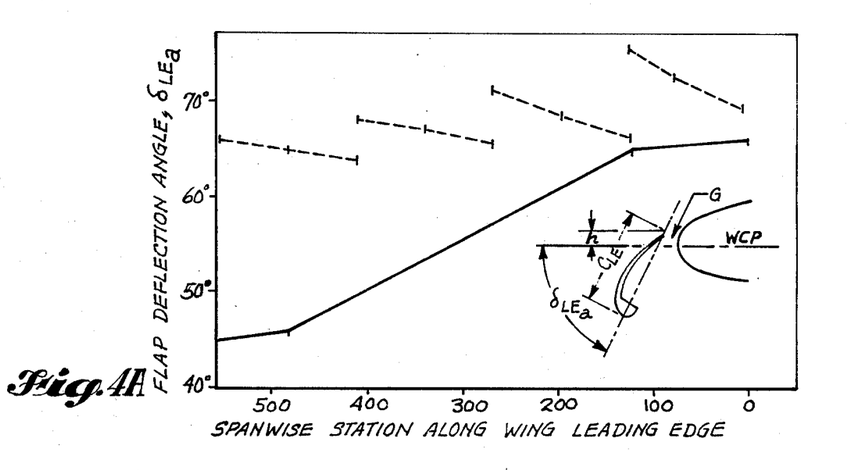
FIGS. 4A to 4D are graphs depicting a comparison between the leading edge geometry of the present invention shown in solid lines, with that of a most recently known flap system on a Boeing YC-14 aircraft.
Figure 4B:
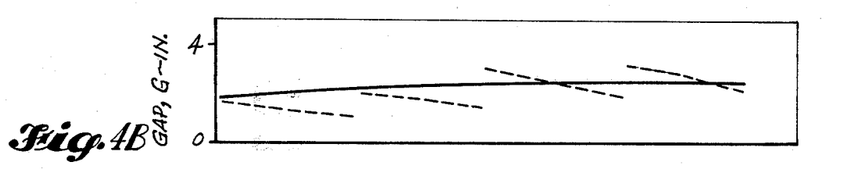
Figure 4C:
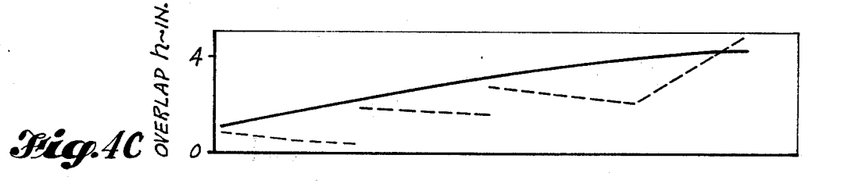
Figure 4D:
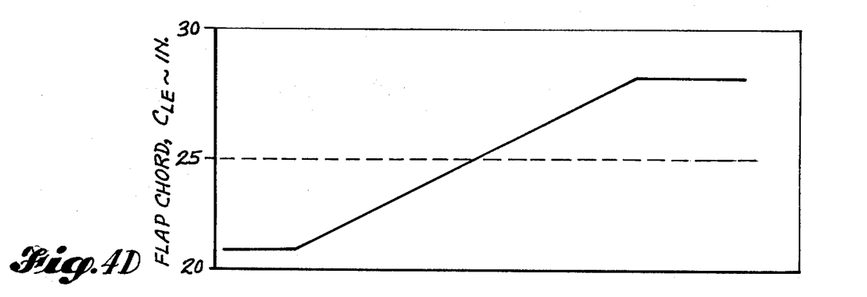

In FIG. 4A, for the YC-14 airplane, shown in dashed lines, the spanwise series of flap segments operate in pairs, and in order to approximate the aerodynamically desired deflection schedule, large steps were introduced between the dual flap segments. As a result of this stepped gap arrangement between the double panel flap units, as shown by the dashed lines in FIG. 4B, the resulting surface discontinuities and air leaks between the flap segments produced a substantial aerodynamic penalty.

With respect to FIG. 4A, it will be noted that the dashed lines representing the YC-14 flap-chord, angle-of-incidence or flap deflection angle, appear to go contrary to the direction of the solid line representing the flap-chord angle of deflection of the present invention. The reason for this is that when the flap is retracted, the flap segment at an inboard spanwise station would be lying flush to the undersurface of an airfoil cross-section of greater size than the flap segment at an outboard station that would be lying flush with the undersurface of an airfoil cross-section of less size; therefore, when the inboard and outboard flap segments are extended, or as represented in FIG. 4A when pairs of flap segments are extended, and the linkage mechanism is rotatably driven the same number of degrees at each inboard and outboard station, i.e., the driving arm 25, as shown in FIG. 7, at each station is rotated the same number of degrees, the flap-chord angle-of-incidence of the inboard flap segment would be greater than that of the outboard flap segment because their starting retracted positions were different due to their lying flush to the undersurface of the airfoil cross-sections that vary in thickness spanwise.

Figure 5:
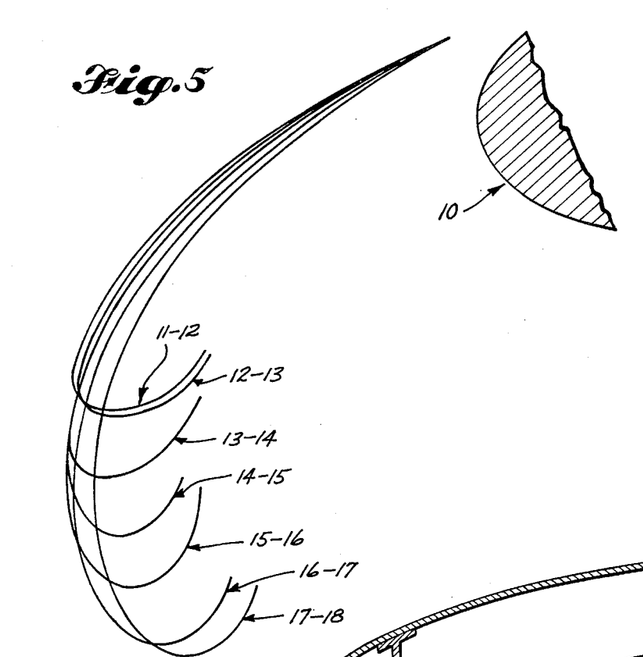
FIG. 5 is an overlay composite of cross-sections of the complete series of spanwise flap segments to show the progressive change throughout the span.

FIG. 5 depicts an overlay series of the flap cross-sectional shape between the spanwise flap segments indicated; and as can be seen, there is a progressive change in cross-sectional shape of the flap throughout the spanwise length of the flap system, as well as a continuous change in the angle-of-incidence of the flap-chord relative to the wing-chord plane.

Figure 6:
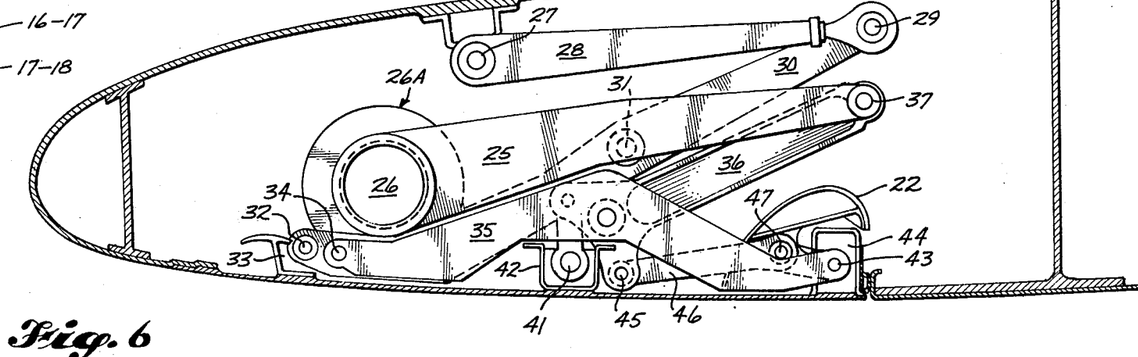
FIG. 6 is a chordwise cross-sectional view of the variable camber leading edge wing flap in the stowed position within the airfoil envelope of the wing, whereat it completes the undersurface profile of the fixed wing airfoil.
Figures 7, 8:
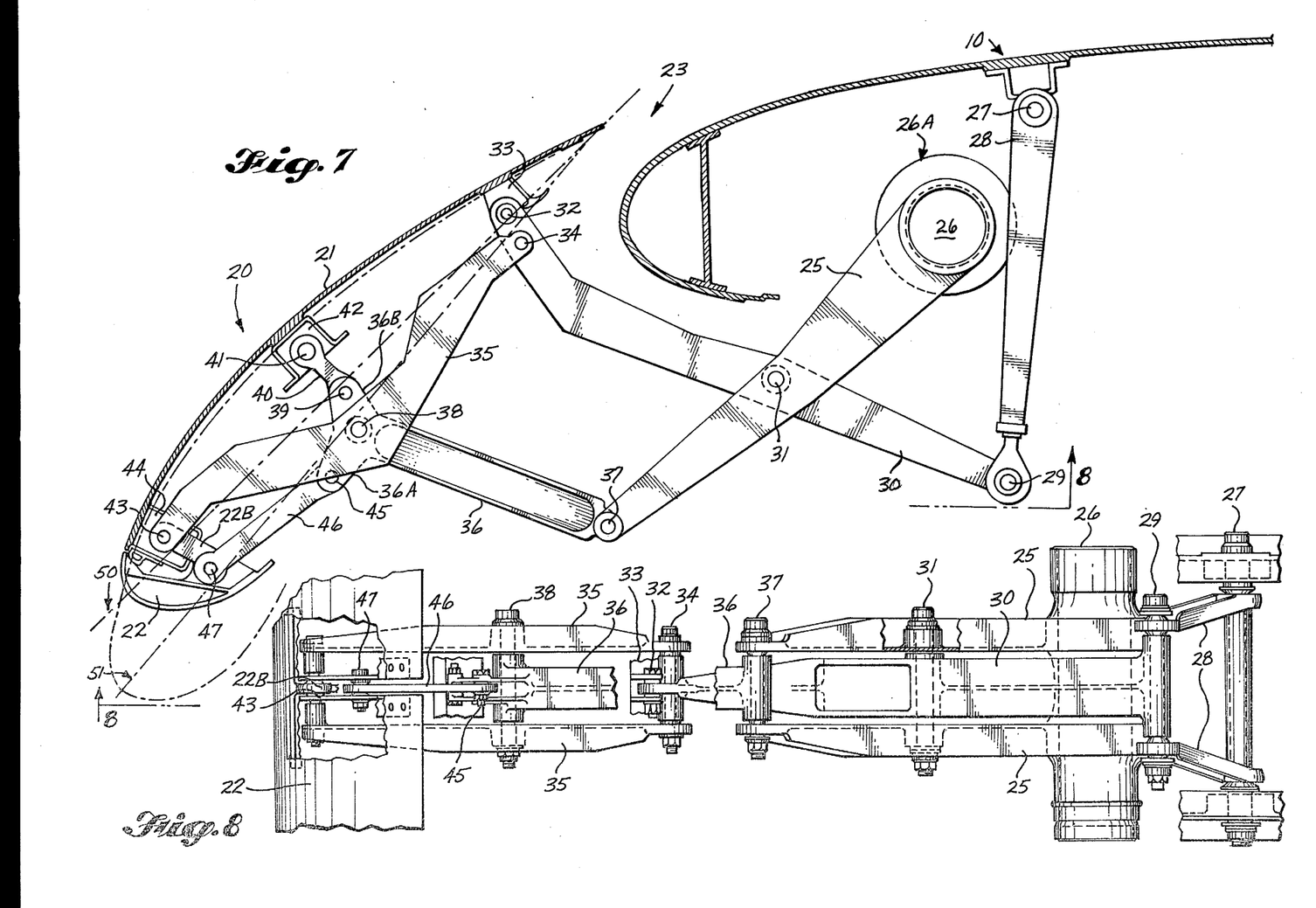
FIG. 7 is a view similar to FIG. 6 with the leading edge flap extended and whereat an aerodynamic slot is formed.
FIG. 8 is a bottom plan view of FIG. 7 taken along the lines 8—8 in the direction indicated on FIG. 7.

FIGS. 6 and 7 are chordwise cross-sectional views of the wing leading edge, variable camber flap mechanism of the present invention, arranged respectively at a retracted stage, whereat the variable camber flap is stowed completely within the airfoil envelope of the wing 10, and an extended stage, whereat an aerodynamic slot 23 is formed between the trailing edge of the flap 20 and the leading edge of the fixed wing 10. The slotted leading edge flap functions to delay stall and increase the maximum usable lift of the airfoil during the takeoff and landing phase of airplane operation. The upper surface of the flap 20 comprises a rectangular or constant chord-width, flexible skin panel 21 which is flexed by a pair of identically sized linkage mechanisms that are arranged and actuated in a chordwise plane for extending and retracting each spanwise segment or flap panel.

Referring to FIG. 7 for the detailed description of the flap linkage mechanism comprising, a driving arm 25 splined to a torque shaft 26 of a rotary actuator 26A which in turn is fixedly fastened to fixed wing structure. Spaced chordwise aft of the driving arm pivot 26 is a fixed structural pivot 27 for the upper end of a support arm 28. The lower end of support arm 28 is pivotally connected at 29 to one end of a horizontal carrier member 30. The mid-section of carrier member 30 is connected at pivot 31 to the intermediate portion of the driving arm 25. The forward portion of carrier member 30 is pivotally connected at 32 to the aft portion of the flexible flap panel 21 through a bracket 33. Also, the forward portion of carrier member 30 is pivotally connected at 34 to flap-chord link 35 which is approximately parallel to the driving arm 25 when the flap is in the extended position shown. Approximately parallel to the carrier member 30 is a Y-bellcrank 36 which at its aft end is pivotally connected at 37 to the lower end of driving arm 25. The forward end of Y-bellcrank 36 has arms or branches 36A and 36B. At the intersection of these arms, the Y-bellcrank 36 is pivotally connected at 38 to an intermediate section of the flap-chord link 35. The branch 36B connects at pivot 39 to the lower end of a short link 40 which in turn is connected at its upper end at 41 to an intermediate portion of the flexible flap panel 21 through a bracket 42, for curvature control of the aerodynamic shape. The lower forward end of the flap-chord link 35 is pivotally connected at 43 to the forward portion of the flexible flap panel 21 through a bracket 44. The lower forward end of the Y-bellcrank 36, or through branch 36A is connected at 45 to the upper end of a short link 46 which in turn is connected at its lower end at 47 to the spanwise tapered bullnose 22 forming a rounded leading edge structure for the flexible panel 21. The bullnose 22 has a bracket arm 22B integral therewith, through which it is supported and pivotally mounted at 43 for rotation, on the lower end of flap-chord link 35.

Referring to FIG. 7, the solid lines represent the position of the flap 20 relative to the wing airfoil section 10 at an outboard location on a spanwise flap panel having a flap-chord line 50; and the dashed outline superimposed onto solid flap outline represents a flap cross-sectional shape at a spanwise station inboard from that shown in solid outline and with a flap-chord line 51.

Aerodynamically, the flap-chord line is defined as the longest straight line connecting a tangent point on the nose of the flap with the trailing edge point, and the angle of interest to the aerodynamicist is the deflection angle that the flap-chord line makes with respect to the wing-chord plane.

Since the leading edge point on the flap or the tip of the bullnose forms the forward point for the definition of the flap-chord line, by reshaping the cross-sectional shape of the bullnose, the effective angular orientation of the flap-chord line, with respect to the wing-chord plane, can be changed, i.e., the spanwise variation of the cross-sectional shape of the bullnose member, can in itself, be made to redefine the chord-plane of the leading edge device or flap. In some instances, the spanwise length of the flap segment may be such that the entire amount of the desired spanwise change in the flap-chord angle-of-incidence can be accomplished solely by changing the cross-sectional shape of the bullnose member and without changing the orientation of the linkage mechanism or anything else. For additional variation in deflection of the flap-chord angle-of-incidence spanwise along the leading edge of the fixed wing section, a twist effect can be imparted to the flexible rectangular panel 21 through a slight variation in the degrees of angular rotation of the common flap linkage mechanisms attached to either end of the spanwise segment or panel 21. However, as can be seen from the overlay section shown in FIG. 7, the greatest amount of change in the angle-of-incidence of the flexible flap panel, between its pair of spanwise spaced linkage mechanisms which are attached to each end of the panel, is accomplished by the change in cross-sectional shape of the bullnose member and only a slight amount is due to the variation or change in degrees of angular rotation of the linkage members.

With respect to the aerodynamic slot 23, when the degrees of rotation of the driving arm 25 and the associated linkage members are varied sequentially depending upon their spanwise location, then the width of the aerodynamic slot 23 also becomes tapered in a spanwise direction as the flap-chord angle-of-incidence is changed; and this improves the aerodynamic characteristics of the flap and wing combination as well as the load distribution over the combined planform area.

While the invention has been disclosed with references to a preferred embodiment, it is to be understood that those modifications and changes which become obvious to a person skilled in the art to which this invention pertains, as a result of the teachings hereof, are considered to be encompassed by the following claims.

What is claimed is:

1. A leading edge flap span for an airfoil, comprising: a spanwise series of flap segments; each flap segment having in combination, a flexible constant chord length panel and a leading edge bullnose member, and said combination producing a flap-chord plane; each of said bullnose members being tapered spanwise to form in combination with each of said constant chord length panels, a series of spanwise tapered flap segments; means for extending the spanwise series of flap segments to form a uniformly varying tapered leading edge flap span for the airfoil; and each spanwise tapered flap segment having its flexible constant chord length panel and leading edge bullnose member, in chordwise combination, forming an aerodynamically smooth and continuous upper surface curvature.

2. The leading edge flap span as set forth in claim 1, wherein: each of said bullnose members has its spanwise taper produced by a chordwise cross-sectional shape which changes in a spanwise direction such that a variation in the angle-of-incidence of the flap-chord plane throughout the leading edge flap span of the airfoil, is produced.

3. The leading edge flap span as set forth in claim 1, wherein: each of said flexible constant chord length panels having spanwise, an inboard and an outboard edge; and said flap extending means changes the degree of angular rotation between said inboard and outboard edge of each panel for imparting a spanwise twist effect thereto, so as to uniformly vary the angle-of-incidence of the flap-chord plane throughout the leading edge flap span of the airfoil.

4. A leading edge flap span for an airfoil, comprising: a spanwise series of flap segments; each flap segment having in combination, a flexible constant-chord panel and a leading edge bullnose member, and said combination producing a flap-chord plane; each of said bullnose members having a changing chordwise cross-sectional shape for producing, in combination with each of said constant-chord panels, both a variation in the angle-of-incidence of the flap-chord plane and a tapered flap segment; each of said flexible constant-chord panels having spanwise, an inboard and an outboard edge; means for extending the spanwise series of flap segments so as to change the degree of angular rotation between said inboard and outboard edge of each panel for imparting a spanwise twist effect thereto to vary the angle-of-incidence of the flap-chord plane of each of the spanwise series of flap segments, in addition to the variation in the angle-of-incidence of the flap-chord pland produced by the change in cross-sectional shape of said bullnose member; and each spanwise flap segment having its flexible constant-chord panel and leading edge bullnose member, in chordwise combination, forming an aerodynamically smooth and continuous upper surface curvature.

5. A leading edge flap span for an airfoil, comprising; a spanwise series of flap segments having an inboard and an outboard constant-chord flap segment, with a variable-chord flap segment therebetween; said variable-chord flap segment having in combination, a flexible constant-chord panel and a leading edge bullnose member, and said combination producing a flap-chord plane; said bullnose member having a chordwise cross-sectional shape which changes in a spanwise direction for forming, in combination with said constant-chord panel, said variable-chord flap segment; said variable-chord flap segment providing a smooth transitional contour change between the leading edge contours of the inboard and outboard constant-chord flap segments; and means for extending the spanwise series of flap segments to form a continuous flap span for the airfoil.

6. The leading edge flap span as set forth in claim 5, wherein: the chordwise cross-sectional shape of said bullnose member, changes in a spanwise direction for producing a variation in the angle-of-incidence of the flap-chord plane between the leading edge contours of the inboard and outboard constant-chord flap segments.

7. The leading edge flap span as set forth in claim 5, wherein: said flexible constant-chord panel having spanwise, an inboard and an outboard edge; and said flap extending means changes the degree of angular rotation between the inboard and outboard edges of the flexible constant-chord panel for the variable-chord flap segment to impart a spanwise twist effect thereto, for producing a smooth transitional variation in the angle-of-incidence of the flap-chord plane between the leading edge contours of the inboard and outboard constant-chord flap segments.

8. A leading edge flap span for an airfoil, comprising: a spanwise series of flap segments having an inboard and an outboard constant-chord flap segment, with a variable-chord flap segment therebetween; said variable-chord flap segment having in combination, a flexible constant-chord panel and a leading edge bullnose member, and said combination producing a flap-chord plane; said bullnose member having a changing chordwise cross-sectional shape for producing in combination with said flexible constant-chord panel, both a variation in the angle-of-incidence of the flap-chord plane and a variable-chord flap segment; said flexible constant-chord panel having spanwise, an inboard and an outboard edge; means for extending the spanwise series of flap segments so as to change the degree of angular rotation between the inboard and outboard edges of the flexible constant-chord panel of the variable-chord flap segment for imparting a spanwise twist effect thereto to vary the angle-of-incidence of the flap-chord plane of the variable-chord flap segment, in addition to the variation in the angle-of-incidence of the flap-chord plane produced by the change in cross-sectional shape of said bullnose member.

9. A leading edge flap span for an airfoil, comprising: a spanwise series of flap segments having an inboard and an outboard constant-chord flap segment, with a tapered flap segment therebetween; said tapered flap segment having in combination, a flexible constant-chord panel and a leading edge bullnose member, and said combination producing a flap-chord plane; said bullnose member having a chordwise cross-sectional shape which changes in a spanwise direction for forming, in combination with said constant-chord panel, said tapered flap segment; said tapered flap segment providing a uniformly varying transitional contour change between the leading edge contours of the inboard and outboard constant-chord flap segments; and means for extending the spanwise series of flap segments to form a continuous flap span for the airfoil.

10. The leading edge flap span as set forth in claim 9, wherein: the chordwise cross-sectional shape of said bullnose member, changes in a spanwise direction for producing a uniform variation in the angle-of-incidence of the flap-chord plane between the leading edge contours of the inboard and outboard constant-chord flap segments.

11. The leading edge flap span as set forth in claim 9, wherein: said flexible constant-chord panel having spanwise, an inboard and an outboard edge; and said flap extending means changes the degree of angular rotation between the inboard and outboard edges of the flexible constant-chord panel for the tapered flap segment to impart a spanwise twist effect thereto, so as to uniformly vary the angle-of-incidence of the flap-chord plane between the leading edge contours of the inboard and outboard constant-chord flap segments.

12. A leading edge flap span for an airfoil, comprising: a spanwise series of flap segments having an inboard and an outboard constant-chord flap segment, with a tapered flap segment therebetween; said tapered flap segment having in combination, a flexible constant-chord panel and a leading edge bullnose member, and said combination producing a flap-chord plane; said bullnose member having a changing chordwise cross-sectional shape for producing in combination with said flexible constant-chord panel, both a variation in the angle-of-incidence of the flap-chord plane and the taper in planform resulting in said tapered flap segment; said flexible constant-chord panel having spanwise, an inboard and an outboard edge; means for extending the spanwise series of flap segments so as to change the degree of angular rotation between the inboard and outboard edges of the flexible constant-chord panel of the tapered flap segment for imparting a spanwise twist effect thereto to vary the angle-of-incidence of the flap-chord plane of the tapered flap segment, in addition to the variation in the angle-of-incidence of the flap-chord plane produced by the change in cross-sectional shape of said bullnose member.

13. A leading edge flap system for the wing of an aircraft, comprising: a spanwise series of flap segments; each flap segment having in combination, a flexible constant-chord rectangular panel and a leading edge bullnose member, and said combination producing a flap-chord plane; each of said bullnose members being tapered spanwise in its cross-sectional shape and providing a smoothly tapered transition of the leading edge between the spanwise series of flap segments; each spanwise flap segment having its flexible rectangular panel and leading edge bullnose member, in chordwise combination, forming an aerodynamically smooth and continuous upper surface curvature; a dual linkage mechanism spaced apart spanwise and utilizing a common sized geometrical linkage at both an inboard and an outboard location on each flap segment for extending and retracting the flap segment; and means for changing the degree of angular rotation between the dual linkage mechanism attached to the inboard and outboard location of each flap segment, for imparting a spanwise twist effect to the flexible rectangular panel and uniformly varying the spanwise angle-of-incidence of the series of flap segments relative to the wing of the aircraft.

14. The leading edge flap span as set forth in claim 13, wherein: the chordwise cross-sectional shape of each said bullnose member, changes in a spanwise direction for producing a variation in the angle-of-incidence of the flap-chord plane, in addition to the variation in the angle-of-incidence of the flap-chord plane produced by changing the degree of angular rotation between the dual linkage mechanism.

15. A leading edge flap system for the wing of an aircraft, comprising: a spanwise series of flap segments having an inboard and an outboard constant-chord flap segment, with a variable-chord flap segment therebetween; said variable-chord flap segment having in combination, a flexible constant-chord panel and a leading edge bullnose member, and said combination producing a flap-chord plane; said variable-chord flap segment having its flexible constant-chord panel and leading edge bullnose member, in chordwise combination, forming an aerodynamically smooth and continuous upper surface curvature; said bullnose member having a chordwise cross-sectional shape which changes in a spanwise direction for forming, in combination with said constant-chord panel, said variable-chorf flap segment; said variable-chord flap segment providing a smooth transitional contour change between the leading edge contours of the inboard and outboard constant-chord flap segments; a dual linkage mechanism spaced apart spanwise and utilizing a similar geometrical linkage at both an inboard and an outboard location on each flap segment for extension and retraction thereof; and means for changing the degree of angular rotation between the dual linkage mechanism attached to the inboard and outboard location of said variable-chord flap segment, for imparting a spanwise twist effect to the flexible constant-chord panel thereof, for producing a smooth transitional variation in the angle-of-incidence of the flap-chord plane between the leading edge contours of the inboard and outboard constant-chord flap segments.

16. A leading edge flap system for the wing of an aircraft, comprising: a spanwise series of flap segments having an inboard and an outboard constant-chord flap segment, with a tapered flap segment therebetween; said tapered flap segment having in combination, a flexible constant-chord panel and a leading edge bullnose member, and said combination producing a flap-chord plane; said bullnose member having a chordwise cross-sectional shape which changes in a spanwise direction for forming, in combination with said constant-chord panel, said tapered flap segment; said tapered flap segment providing a uniformly varying transitional contour change between the leading edge contours of the inboard and outboard constant-chord flap segments; said tapered flap segment having its flexible constant-chord panel and leading edge bullnose member, in chordwise combination, forming an aerodynamically smooth and continuous upper surface curvature; a dual linkage mechanism spaced apart spanwise and utilizing a similar geometrical linkage at both an inboard and an outboard location on each flap segment for extension and retraction thereof; and means for changing the degree of angular rotation between the dual linkage mechanism attached to the inboard and outboard location of said tapered flap segment, for imparting a spanwise twist effect to the flexible constant-chord panel thereof, for producing a smooth transitional variation in the angle-of-incidence of the flap-chord plane between the leading edge contours of the inboard and outboard constant-chord flap segments.

17. A tapered variable camber leading edge flap system for the tapered wing of an aircraft, comprising: the wing leading edge flap span being divided into a series of spanwise flap segments; each spanwise flap segment having in combination, an upper surface flexible-skin panel of a constant chord length and a leading edge bullnose member, and said combination producing a flap-chord plane; each spanwise flap segment having its flexible-skin panel and leading edge bullnose member, in chordwise combination, forming an aerodynamically smooth and continuous upper surface curvature; each of said flap segments having a spanwise, an inboard and an outboard end; a dual linkage mechanism spaced apart spanwise and utilizing a similar geometrical linkage at both an inboard and an outboard location on each flap segment for extending and chordwise cambering the series of spanwise flap segments from a stowed position beneath the wing leading edge to an operative, forwardly and downwardly extending position; said bullnose member having a chordwise cross-sectional shape which changes in a spanwise direction for producing in combination with said flexible constant-chord panel, both a variation in the angle-of-incidence of the flap-chord plane between the inboard and outboard ends of each flap segment, and a taper in planform resulting in a tapered flap segment; said bullnose members forming in a spanwise series combination, a uniformly varying angle-of-incidence of the flap-chord plane for the spanwise series of flap segments, and a smoothly tapered leading edge flap span for the tapered wing of said aircraft when said flap segments are extended to their forward operating position; said dual linkage mechanism changing the degree of angular rotation of the flap-chord plane relative to the wing between the inboard and outboard ends of each flap segment during extension of the wing leading edge flap span, for imparting a spanwise twist effect to the flexible-skin panels of the series of spanwise flap segments so as to uniformly vary the angle-of-incidence of the flap-chord plane in a spanwise direction from inboard to outboard of the tapered wing of the aircraft, in addition to the variation in the angle-of-incidence of the flap-chord plane produced by the change in cross-sectional shape of said bullnose member.

18. A variable camber leading edge flap system for the wing of an aircraft, comprising: the wing leading edge flap span being divided into a series of spanwise flap segments; each spanwise flap segment having in combination, an upper surface flexible-skin panel of a constant chord length and a leading edge bullnose member, and said combination producing a flap-chord plane; each spanwise flap segment having its flexible constant chord length panel and leading edge bullnose member, in chordwise combination, forming an aerodynamically smooth and continuous upper surface curvature; each flap segment having spanwise, an inboard and an outboard end; a dual linkage mechanism spaced apart spanwise and utilizing a similar geometrical linkage at both an inboard and an outboard location on each flap segment for extending and chordwise cambering the series of spanwise flap segments from a stowed position beneath the wing leading edge to an operative, forwardly and downwardly extending position; each of said bullnose members having a chordwise cross-sectional shape which changes in a spanwise direction for producing in combination with its respective flexible constant chord length panel, both a variation in the angle-of-incidence of the flap-chord plane between the inboard and outboard ends of each flap segment, and a taper in planform resulting in a variable-chord flap segment; said bullnose members forming in a spanwise series combination, a smooth transitional variation in the angle-of-incidence of the flap-chord plane for the spanwise series of flap segments, and a smooth transitional tapering of the leading edge flap span for the wing of an aircraft when said flap segments are extended to their forward operating position; said dual linkage mechanism changing the degree of angular rotation of the flap-chord plane relative to the wing between the inboard and outboard ends of each flap segment during extension of the wing leading edge flap span, for imparting a spanwise twist effect to the flexible-skin panels of the series of spanwise flap segments so as to uniformly vary the angle-of-incidence of the flap-chord plane in a spanwise direction from inboard to outboard of the wing of the aircraft, in addition to the variation in the angle-of-incidence of the flap-chord plane produced by the change in cross-sectional shape of said bullnose member.

19. A leading edge flap span for an airfoil, comprising: a constant chord length panel; a bullnose member connected to said panel for forming the leading edge of said flap; said panel and bullnose member, in chordwise combination, forming a flap airfoil-section having a flap-chord line; said flap airfoil-section having an aerodynamically smooth upper surface contour; said bullnose member being tapered spanwise to form in combination with said panel, a spanwise tapered flap; two sets of linkage mechanisms spaced apart spanwise for connecting each spanwise end portion, of said spanwise tapered flap, to said airfoil; each of said sets of linkage mechanisms having common sized linkage members for connection to both said panel and bullnose member; means for actuating said two sets of linkage mechanisms to extend said spanwise tapered flap and form the leading edge flap for the airfoil; and said bullnose member having said spanwise tapered shape for producing an effective aerodynamic twist of the flap-chord line along the leading edge flap span of the airfoil.

* * * * *